(12) United States Patent
Honda et al.

(10) Patent No.: US 6,765,785 B2
(45) Date of Patent: Jul. 20, 2004

(54) POLYMER ELECTROLYTE COMPOSITE FOR DRIVING AN ELECTROLYTIC CAPACITOR, AN ELECTROLYTIC CAPACITOR USING THE SAME, AND A METHOD OF MAKING THE ELECTROLYTIC CAPACITOR

(75) Inventors: Kazumitsu Honda, Katano (JP); Nario Niibo, Hirakata (JP); Yuichiro Tsubaki, Uji (JP); Junji Ozaki, Uji (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 43 days.

(21) Appl. No.: 10/158,131

(22) Filed: May 31, 2002

(65) Prior Publication Data

US 2003/0076648 A1 Apr. 24, 2003

(30) Foreign Application Priority Data

| Jun. 1, 2001 | (JP) | .................................. | 2001-166595 |
| Sep. 14, 2001 | (JP) | .................................. | 2001-279963 |
| Dec. 18, 2001 | (JP) | .................................. | 2001-384347 |

(51) Int. Cl.$^7$ ................................................ H01G 9/02
(52) U.S. Cl. .................................... 361/525; 252/62.2
(58) Field of Search ............................... 361/523–527; 252/62.2

(56) References Cited

FOREIGN PATENT DOCUMENTS

| JP | 62-48716 | 3/1987 |
| JP | 5-55088 | 3/1993 |
| JP | 8-295711 | 11/1996 |

*Primary Examiner*—Dean A. Reichard
*Assistant Examiner*—Eric Thomas
(74) *Attorney, Agent, or Firm*—McDermott, Will & Emery (57) ABSTRACT

The polymer electrolyte composite, for driving an electrolytic capacitor, according to the present invention is a composite body including an electrolyte and an acrylic polymer containing a copolymer of acrylic derivative. The electrolyte includes a polar solvent and a solute including at least one of inorganic acids, organic acids and salts of such acids. The copolymer of acrylic derivative is a polymer of: a first monomer of at least one of a group of monofunctional monomers of acrylic derivatives each having at least one hydroxyl group at a terminal thereof and a polymerizable unsaturated double bond; and a second monomer of at least one of a group of multifunctional monomers of acrylic derivatives each having plural polymerizable unsaturated double bonds. The polymer electrolyte composite has a high ionic conductivity at room temperature together with a high heat resistance, and does not react with electrode foils such as aluminum, and moreover is superior in the easiness of manufacturing and long life. The present invention also provides an electrolytic capacitor using the polymer electrolyte composite.

12 Claims, 1 Drawing Sheet

POLYMER ELECTROLYTE COMPOSITE FOR DRIVING AN ELECTROLYTIC CAPACITOR, AN ELECTROLYTIC CAPACITOR USING THE SAME, AND A METHOD OF MAKING THE ELECTROLYTIC CAPACITOR

BACKGROUND OF THE INVENTION

The present invention relates to a polymer electrolyte composite for driving an electrolytic capacitor, an electrolytic capacitor using the same, and a method of making the electrolytic capacitor.

An electrolytic capacitor has such a structure that a cathode and an anode having a dielectric oxide film formed thereon by anodic oxidation sandwich an electrolyte. Kinds of electrolytes can be categorized into three types: ion conductive type using a liquid electrolyte; ion conductive type using a solid electrolyte; and electron conductive type using a solid electrolyte.

An electrolyte of ion conductive type using a liquid electrolyte has an advantage in that a high voltage for anodic oxidation can be applied between the anode and the cathode of the electrolytic capacitor when such a high voltage application is needed to reform or recover the dielectric oxide film having deep defects or unformed places. Namely, it is capable to apply a high forming voltage for the purpose of reforming the dielectric oxide film, thereby to be able to easily recover defects therein. Here, the capability of application of a high reforming voltage means that sparks are not generated at lower voltages voltages, i.e. that sparking voltage or minimum voltage for spark generation is high.

However, such an electrolyte of ion conductive type using a liquid electrolyte has drawbacks as well. In order to retain a liquid electrolyte between an anode and a cathode, a separator is required, which should be able to be sufficiently filled with the liquid electrolyte and which sufficiently separates the anode and the cathode. In order to meet the requirement, it becomes necessary to use a separator material, such as paper and nonwoven fabric, having a sufficiently high weighting, i.e. product of density and thickness. Although a liquid electrolyte itself has a comparatively high ionic conductivity and a comparatively low electric resistance which is usually expressed by equivalent series resistance (ESR), the combined body of the separator and the liquid electrolyte gets to have a high electric resistance because of the high weighting of the separator. In other words, the total resistance loss of a resultant electrolytic capacitor becomes large due to the separator although the resistance loss by the liquid electrolyte itself can be made comparatively small. Furthermore, since the liquid electrolyte is of liquid by definition, it has drawbacks as to e.g. liquid leakage and difficulties in mounting to electrical devices and machining.

For the above reasons, it has been studied to solidify liquid electrolytes. Solid electrolytes do not have drawbacks caused by the use of liquid. In one example of a solid electrolyte having an electronic conductivity, polypyrrole is used as electrolyte in place of the liquid electrolyte, and a porous resin such as polypropylene and polyethylene is used as separator. Since it uses electronic conductivity, it has a low electric resistance, contributing to a small resistance loss of the resultant electrolytic capacitors. However, in the case of the solid electrolytes of electron conductive type, it is difficult to sufficiently recover the dielectric oxide film by applying a high reforming voltage even though the dielectric oxide film has defects therein. This is because in the case of such type, sparks are likely to be generated with an application of a comparatively low reforming voltage. Namely, such solid electrolytes of electron conductive type have little function of recovering the dielectric oxide film.

On the other hand, solid electrolytes of ion conductive type can be categorized into inorganic systems and polymer systems. The inorganic systems have drawbacks in that they are heavy, inflexible and difficult to form, although they have an advantage in their high ionic conductivities.

Solid polymer systems, i.e. ion conductive polymers, are drawing attention because they are superior in their mechanical properties in e.g. lightness in weight, flexibility and formability or easiness of manufacturing, although they have much lower ionic conductivities.

Examples of ion conductive polymers having been reported are: mixture of polyethylene oxide (PEO) with a lithium salt, having an ionic conductivity of about $10^{-4}$ S/cm at 100° C. (see "Polymer", 14, 586 (1973)); mixture of diisocyanate crosslinked polymer of triol type polyethylene oxide with a metal salt, having an ionic conductivity of $10^{-5}$ S/cm at 30° C. (See Japanese Laid-open Patent Publication Sho 62-48716); copolymer of oligooxyethylene polymethacrylate and an alkaline metal salt of methacrylic acid in which pair ions are fixed, having an ionic conductivity of $10^{-7}$ S/cm at room temperature (see "Polymer Reprints Japan", 35, 583 (1986)); and mixture of monofunctional and multifunctional acryloyl-modified polyalkylene oxides with an alkaline metal and/or an alkaline earth metal, having an ionic conductivity of $10^{-3}$ S/cm at 20° C. (See Japanese Laid-open Patent Publication Hei 8-295711). Further, an example of ion conductive polymers having been actually used for electrolytic capacitors is composed of a solvent and an electrolyte salt together with a thermally metamorphosed polymer and/or a cellulose derivative, having an ionic conductivity of $10^{-3}$ S/cm at room temperature (See Japanese Laid-open Patent Publication Hei 5-55088), wherein the solvent contains a polyhydric alcohol compound having a molecular weight of 200 or lower, and the thermally metamorphosed polymer contains albumen protein and/or β-1,3 glucan.

However, some of the above described ion conductive polymers have too low ionic conductivities to cause too large resistance losses, so that electrolytic capacitors using such ion conductive polymers cannot have sufficient performances. Other ones of the above described ion conductive polymers have too low heat resistances, though they may have ionic conductivities similar to those of liquid electrolytes. Furthermore, the existence of metal salts in the above described ion conductive polymers is likely to cause short-circuiting of the resultant electrolytic capacitors when they are used at a high temperature, and makes it difficult to obtain satisfactory characteristics.

BRIEF SUMMARY OF THE INVENTION

It is an object of the present invention to solve the problems of such prior art as described above, and to provide a polymer electrolyte composite for driving an electrolytic capacitor, in which the polymer electrolyte composite has a high ionic conductivity together with a high heat resistance, and does not react with electrode foils such as aluminum, and moreover is superior in the formability or easiness of manufacturing, and long life.

It is another object of the present invention to provide an electrolytic capacitor using the polymer electrolyte composite.

The polymer electrolyte composite, for driving an electrolytic capacitor, according to the present invention is a composite body comprising an electrolyte and an acrylic polymer containing a copolymer of acrylic derivative. The electrolyte comprises a polar solvent and a solute comprising at least one of inorganic acids, organic acids and salts of such acids. The copolymer of acrylic derivative is a polymer of: a first monomer of at least one of a group of monofunctional monomers of acrylic derivatives each having at least one hydroxyl group at a terminal thereof and a polymerizable unsaturated double bond; and a second monomer of at least one of a group of multifunctional monomers of acrylic derivatives each having plural polymerizable unsaturated double bonds. Here, it is to be noted that the hydroxyl group at the terminals of the acrylic derivatives include not only hydroxyl group in a narrow sense, but also hydroxyl group in a wide sense such as carboxyl group, phosphate group and dihydroxyl group, each having a hydroxyl group at a terminal thereof.

It is preferred that the above described copolymer of acrylic derivative constitute a copolymer matrix, and that the above described electrolyte be incorporated in the copolymer matrix, so that the copolymer matrix retains the electrolyte therein.

Furthermore, the copolymer of acrylic derivative preferably contains a polyoxylalkylene group.

It is preferred that the above described solute be free of metal salts as cations. Particularly, the solute preferably comprises at least one salt selected from the group consisting of ammonium salts, amine salts and amidine salts.

The above described group of monofunctional monomers are preferably acrylic derivatives expressed by Formulas (1) to (4), and the above described group of multifunctional monomers are preferably acrylic derivatives expressed by Formulas (5) to (16) as will be described later.

Furthermore, the weight ratio of the first monomer to the second monomer is preferably from 100:3 to 3:100, more preferably 100:10 to 10:100.

Still further, the sum weight of the solute and the copolymer of the acrylic derivative contains the copolymer in an amount of 5 to 50 wt %.

The electrolytic capacitor according to the present invention comprises an anode foil, a cathode foil and a separator sandwiched by the anode and the cathode foils, wherein the separator contains a polymer electrolyte composite for driving the electrolytic capacitor. The polymer electrolyte composite comprises an electrolyte and an acrylic polymer containing a copolymer of acrylic derivative. The electrolyte comprises a polar solvent and a solute comprising at least one of inorganic acids, organic acids and salts of such acids. The copolymer of acrylic derivative is a polymer of: a first monomer of at least one of a group of monofunctional monomers of acrylic derivatives each having at least one hydroxyl group at a terminal thereof and a polymerizable unsaturated double bond; and a second monomer of at least one of a group of multifunctional monomers of acrylic derivatives each having plural polymerizable unsaturated double bonds.

In the electrolytic capacitor, the separator preferably has a weighting of 0.01 to 55 $g/m^2$. Furthermore, the separator preferably is of a porous resin film or a nonwoven fabric. Still further, the separator preferably has a porosity of 10 to 90%.

The method of making an electrolytic capacitor according to the present invention comprises: a step of making a capacitor precursory body comprising an anode foil, a cathode foil and a separator sandwiched between the anode and the cathode foils; a step of impregnating a starting liquid of a polymer electrolyte composite to the capacitor precursory body, thereby to make a starting electrolytic capacitor element; and a step of curing the starting liquid of the polymer electrolyte composite in the starting electrolytic capacitor element. Therein, the starting polymer electrolyte composite liquid comprises a mixture of: an electrolyte solution comprising a polar solvent and a solute comprising at least one of inorganic acids, organic acids and salts of such acids; a first monomer of at least one of a group of monofunctional monomers of acrylic derivatives each having at least one hydroxyl group at a terminal thereof and a polymerizable unsaturated double bond; and a second monomer of at least one of a group of multifunctional monomers of acrylic derivatives each having plural polymerizable unsaturated double bond. The above method is so arranged that by the above described curing step, the first monomer and the second monomer get copolymerized, thereby to form a copolymer matrix, and that the electrolyte solution is incorporated in the copolymer matrix in an essentially gel state as an electrolyte for driving the electrolytic capacitor.

While the novel features of the present invention are set forth particularly in the appended claims, the present invention, both as to organization and content, will be better understood and appreciated, along with other objects and features thereof, from the following detailed description taken in conjunction with the drawings.

DETAILED DESCRIPTION OF THE INVENTION

Hereinafter, presently preferred embodiments to carry out the present invention will be described with reference to the drawings, and more specifically described using Examples. However, the present invention, as defined in the appended claims, is not limited to such certain embodiments or Examples.

Figure 1:
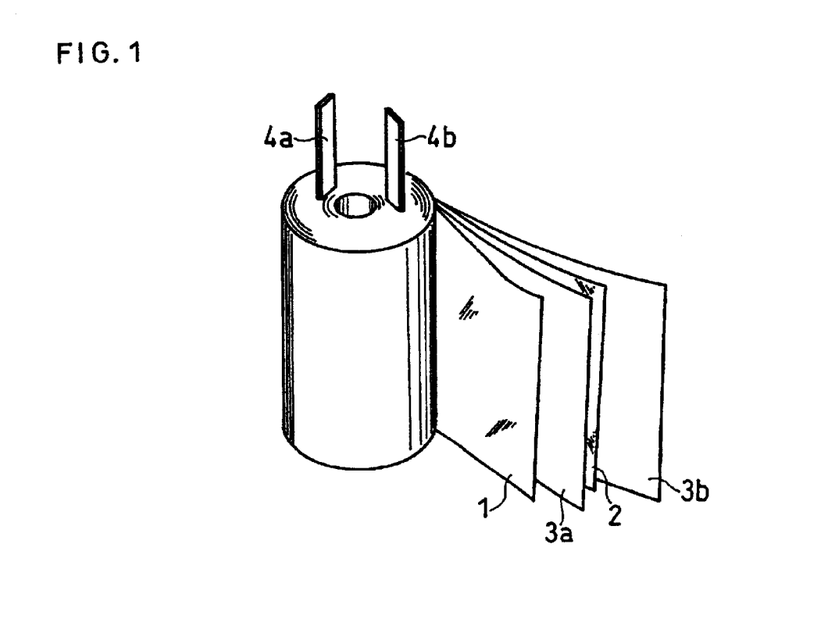
FIG. 1 is a schematic perspective view of an electrolytic capacitor according to an embodiment of the present invention, showing main constituting components thereof.

FIG. 1 is a schematic perspective view of an electrolytic capacitor or electrolytic capacitor element according to an embodiment of the present invention, showing main constituting components thereof. As shown in FIG. 1, the basic structure of the electrolytic capacitor comprises an anode foil 1, as anode, made of e.g. aluminum and a cathode foil 2, as cathode, made of e.g. aluminum and separators 3a and 3b which contain a polymer electrolyte composite as will be described later, and which are sandwiched between the anode and cathode foils. The anode foil 1, the cathode foil 2 and the separators 3a and 3b are wound up so that the anode and cathode foils face each other with separators 3a and 3b therebetween. Lead wires 4a and 4b for electrical connection are connected to the anode foil 1 and the cathode foil 2, respectively.

In the following, a method of making such electrolytic capacitor will be described. Firstly, an anode foil 1, a cathode foil 2 and separators 3a, 3b sandwiched between the anode and cathode foils are wound up so that the anode and cathode foils face each other with the separators therebetween. Thereby, a capacitor precursory body is made. A starting liquid of a polymer electrolyte composite comprising an electrolyte solution and a polymer material in a liquid state, which will be described later, is impregnated in the capacitor precursory body, thereby to make a starting electrolytic capacitor element. Thereafter, although not shown, the starting electrolytic capacitor element is put in a case of e.g. aluminum, and then is sealed with a sealant such as rubber and phenol resin. Before or after such sealing step, the starting liquid of the polymer electrolyte composite is cured by e.g. heating. In this way, an electrolytic capacitor according to an embodiment of the present invention is made.

Here, the starting liquid of the polymer electrolyte composite for driving electrolytic capacitors is a mixture of an electrolyte solution and a polymer material in a liquid state as will be described later. By the above curing step, the polymer material is cured, and a copolymer matrix is formed. At the same time, the electrolyte solution is taken in the copolymer matrix in an essentially gel state as an electrolyte for driving the electrolytic capacitor.

In the following, an embodiment of the polymer electrolyte composite, namely a composite of a polymer and an electrolyte, which is one of the most important points of the present invention will be described.

A polymer electrolyte composite according to an embodiment of the present invention, for driving electrolytic capacitors, is a composite of an electrolyte and an acrylic polymer containing a copolymer of acrylic derivative. Here, the acrylic derivative is defined as a derivative of a compound having a group represented by the formula:

where R is H or an alkyl group having 1 to 5 carbon atoms.

The above described electrolyte comprises a polar solvent and a solute of at least one of inorganic acids, organic acids and salts of such acids. The above described copolymer is a polymer of: a first monomer of at least one of a group of monofunctional monomers of acrylic derivatives each having at least one hydroxyl group at a terminal thereof and a polymerizable unsaturated double bond; and a second monomer of at least one of a group of multifunctional monomers of acrylic derivatives each having plural polymerizable unsaturated double bonds.

Suitable materials for the monofunctional monomers are acrylic derivatives as represented by the following Formulas (1) to (4), and suitable materials for the multifunctional monomers are acrylic derivatives as represented by the following Formulas (5) to (16):

(1)

where $R^1$ is H or an alkyl group having 1 to 5 carbon atoms, $AO^1$ is an oxyalkylene group having 2 to 4 carbon atoms, and n is 1 to 200, on average, of oxyalkylene group having 2 to 4 carbon atoms.

(2)

where $R^1$ is H or an alkyl group having 1 to 5 carbon atoms, and n is 1 to 200, on average, of oxyalkylene group having 2 carbon atoms.

(3)

where $R^1$ is H or an alkyl group having 1 to 5 carbon atoms.

(4)

where $R^1$ is H or an alkyl group having 1 to 5 carbon atoms, and n is 1 to 200, on average, of oxyalkylene group having 2 carbon atoms.

(5)

where $R^3$ is H or an alkyl group having 1 to 5 carbon atoms, $AO^2$ is an oxyalkylene group having 2 to 4 carbon atoms, and n is 1 to 200, on average, of oxyalkylene group having 2 to 4 carbon atoms.

(6)

where $R^3$ is H or an alkyl group having 1 to 5 carbon atoms.

(7)

where $R^1$ and $R^2$ are each independently H or an alkyl group having 1 to 5 carbon atoms.

(8)

where $R^1$ and $R^2$ are each independently H or an alkyl group having 1 to 5 carbon atoms; and l, m and n are each 1 to 200, on average, of oxyalkylene group having 2 carbon atoms.

(9)

where $R^1$ is H or an alkyl group having 1 to 5 carbon atoms.

(10)

where $R^1$ is H or an alkyl group having 1 to 5 carbon atoms.

(11)

where $R^1$ is H or an alkyl group having 1 to 5 carbon atoms.

(12)

where $R^1$ is H or an alkyl group having 1 to 5 carbon atoms, $R^4$ is $-(CH_2)_n-$, $-(C_2H_4O)_n-$ or and n is 1 to 9.

(13)

where $R^1$ is H or an alkyl group having 1 to 5 carbon atoms, $R^4$ is $-(CH_2)_n-$, $-(C_2H_4O)_n-$ or and n is 1 to 9.

where $R^1$ is H or an alkyl group having 1 to 5 carbon atoms, $R^4$ is $-(CH_2)_n-$, $-(C_2H_4O)_n-$ or and n is 1 to 9.

where $R^1$ is H or an alkyl group having 1 to 5 carbon atoms, $R^4$ is $-(CH_2)_n-$, $-(C_2H_4O)_n-$ or and n is 1 to 9.

where $R^1$ is H or an alkyl group having 1 to 5 carbon atoms, and n is 1 to 9.

These monofunctional monomers as represented by Formulas (1) to (4) each have at least one hydroxyl group at a terminal thereof and a polymerizable unsaturated double bond. Here, the hydroxyl group means not only hydroxyl group in a narrow sense, but also hydroxyl group in a wide sense such as carboxyl group, phosphate group and dihydroxyl group, each having a hydroxyl group at a terminal thereof. On the other hand, the multifunctional monomers as represented by Formulas (5) to (16) each have plural polymerizable unsaturated double bonds.

A mixture of the first monomer, i.e. at least one of the monofunctional monomers, and the second monomer, i.e. at least one of the multifunctional monomers can be subjected to radical polymerization reaction, when the mixture is heated or irradiated with ultraviolet rays or electron beam, whereby they can be crosslinked and copolymerized to form a copolymer matrix. At the same time, the electrolyte comprising a polar solvent and a solute of at least one of inorganic acids, organic acids and salts of these acids can be incorporated in the copolymer matrix. That is, the copolymer matrix retains the electrolyte therein. By this structure, a polymer electrolyte composite having a high ionic conductivity at room temperature can be obtained.

Further, by using a compound having a diacrylic acid ester as the acrylic derivative of the multifunctional monomer, it becomes easy to form a three-dimensional crosslinked or bridge structure, which can maintain the skeleton of the copolymer matrix more stably than the case of homopolymerization by acrylic esters of the monofunctional monomers alone. Accordingly, the electrolyte comprising a polar solvent having a solute dissolved therein can be more stably maintained in the copolymer matrix, wherein the solute comprises at least one of inorganic acids, organic acids and salts of such acids.

The use of an acrylic acid ester of the monofunctional monomers, which has a hydrophilic group at a terminal of a molecule thereof, can contribute to resultant affinity with the polar solvent. Therefore, the polar solvent having the above described solute dissolved therein can be readily incorporated in the resultant polymer matrix formed by crosslinking.

Furthermore, the use of an acrylic derivative of the multifunctional monomers, which has a crosslinked structure having a functional group or a crosslinked structure of multi-chain type, can contribute to resultant affinity with the polar solvent and to a higher crosslinking density. Thus, the amount of the electrolyte to be incorporated in or contained in the crosslinked structure or copolymer matrix can be increased.

Still further, the use of an acrylic derivative of a crosslinked structure having a phosphate group can allow the copolymer matrix to more readily adsorb to an anode foil and a cathode foil of a resultant electrolytic capacitor. Thereby, the polymer electrolyte composite formed by the electrolyte and the copolymer of the acrylic derivative can be more intimately contacted to the anode and the cathode foils, so that the contact resistance between the polymer electrolyte composite and each of the electrode foils can be decreased.

This decreased contact resistance further increases the actual ionic conductivity of the electrolyte. Moreover, the copolymer has an advantageous function to maintain a physical distance between the electrode foils, so that it can function to suppress short-circuiting in the electrolytic capacitor having the electrode foils.

In connection with Formulas (1) and (5), the symbol AO denotes an oxyalkylene group having 2 to 4 carbon atoms. Examples usable for such oxyalkylene group are oxyethylene group (EO hereafter), oxypropylene group (PO hereafter), oxybutylene group (BO hereafter) and oxytetramethylene group (TMO hereafter). A polyoxyalkylene group can be either a homopolymer of one of such oxyalkylene group or a copolymer of two or more of such oxyalkylene group, so long as a matrix of polyoxyalkylene group is formed. Appropriate oxyalkylene group are to be selected from among the above described oxyalkylene group, depending on the kinds of polar solvents and solutes as constituents of the used liquid electrolyte from the view point of realizing higher affinity between the matrix of polyoxyalkylene group and the constituents of the liquid electrolyte. This is because such higher affinity therebetween can allow the matrix to incorporate or retain a larger amount of the liquid electrolyte therein.

Polyoxyalkylene group containing two or more oxyalkylene group can have such plural oxyalkylene group added to each other, either randomly or in blocks.

In the resultant copolymer matrix, the state of the electrolyte comprising a polar solvent having at least one of inorganic acids, organic acids and salts of such acids dissolved therein is essentially gel state. Here, this essentially gel state means that at least a substantial portion of the electrolyte is at gel state, which may allow a small portion thereof to be at e.g. solid state or high viscous liquid state, and which is thus not limited to a state where the whole of the electrolyte is perfectly at gel state.

In other words, according to the embodiment of the present invention, an essentially gel electrolyte is basically retained by a copolymer matrix. Accordingly, a separator to be used for making an electrolytic capacitor in accordance with the embodiment of the present invention does not need to have a function to directly retain an electrolyte, e.g. liquid electrolyte, which does not have a self-retaining function. With respect to the retaining function, the separator may only need to retain a copolymer matrix having an essentially gel electrolyte retained therein.

A main function for the separator according to the embodiment of the present invention to have is basically a function to physically isolate the anode and the cathode in an electrolytic capacitor. That is, separator materials according to the embodiment of the present invention are not limited to such paper or nonwoven fabric as having conventionally been used for their function to directly retain liquid electrolytes. Other materials having lower weighting, namely lower electric resistances, can be used for the separators. Accordingly, the combination of a separator and a polymer electrolyte composite according to the embodiment of the present invention can be made to have a lower electric resistance than the conventional combination of a separator and a liquid electrolyte, although the essentially gel electrolytes per se according to the embodiment of the present invention may have lower ionic conductivities and thus higher electric resistances than usual liquid electrolytes.

With respect to the capability of reforming, on the other hand, a higher voltage can be applied to the essentially gel electrolyte according to the embodiment of the present invention than to conventional solid electrolytes such as polypyrrole, because the former is gel whereas the latter is solid. Therefore, when it is needed to recover damaged dielectric oxide film of an anodized anode by applying a reforming voltage between the anode and the cathode of an electrolytic capacitor according to the embodiment of the present invention, a higher voltage can be used for such purpose to realize better recovery of such dielectric oxide film.

In the following, various materials usable for the constituents of polymer electrolyte composites in electrolytic capacitors according to the embodiment of the present invention will be described.

Firstly, examples of polar solvents usable according to the embodiment of the present invention are ethylene glycol, propylene glycol, 1,4-butanediol, glycerine, water and such solvent groups as polyoxyalkylene polyols, amides, alcohols, ethers, nitrites, furans, sulfolanes, carbonates, lactones, imidazolidinones and pyrrolidones. One or a combination, i.e. two or more, of these solvents can be used as a polar solvent according to the embodiment of the present invention.

Specific examples of the above described solvents in the name of solvent groups will be described as follows.

Examples of polyoxyalkylene polyols are polyethylene oxide, polypropylene oxide, polyoxyethylene-oxypropylene glycol, each molecular weight being not larger than 200, and a combination of two or more of such solvents.

Examples of amides are N-methylformamide, N,N-dimethylformamide, N-methylacetamide and N-methylpyrrolidinone.

Examples of alcohols are methanol and ethanol.

Examples of ethers are methylal, 1,2-dimethoxyethane, 1-ethoxy-2-methoxyethane and 1,2-diethoxyethane.

Examples of nitrites are acetonitrile and 3-methoxypropionitrile.

An example of furans is 2,5-dimethoxytetrahydrofuran.

Examples of sulfolanes are sulfolane, 3-methylsulfolane and 2,4-dimethylsulfolane.

Examples of carbonates are propylene carbonate, ethylene carbonate, diethyl carbonate, styrene carbonate, dimethyl carbonate and methyl ethyl carbonate.

Examples of lactones are γ-butyrolactone, γ-valerolactone, δ-valerolactone, 3-methyl-1,3-oxaziridine-2-one and 3-ethyl-1,3-oxazolidine-2-one.

An example of imidazolidinones is 1,3-dimethyl-2-imidazolidinone.

Among the above described polar solvents, preferable ones are ethylene glycol, propylene glycol, diethylene glycol, water, lactones, alcohols, carbonates, ethers, nitrites and furans.

Secondly, examples of organic acids and inorganic acids according to the embodiment of the present invention are boric acid, phosphoric acid, silicotungstic acid, silicomolybdic acid, phosphotungstic acid and phosphomolybdic acid as well as groups of acids such as polycarboxylic acids (dicarboxylic, tricarboxylic and tetracarboxylic), and monocarboxylic acids.

Examples of such polycarboxylic acids are: aliphatic polycarboxylic acids; aromatic polycarboxylic acids; alicyclic polycarboxylic acids; substitution products of such polycarboxylic acids substituted with alkyl group having 1 to 3 carbon atoms or with nitro group, which are e.g. citraconic acid, dimethylmaleic acid and nitrophthalic acid such as 3-nitrophthalic acid and 4-nitrophthalic acid; and sulfur-containing polycarboxylic acids such as thiopropionic acid.

Specific examples of the aliphatic polycarboxylic acids are: saturated polycarboxylic acids such as oxalic acid, malonic acid, succinic acid, glutaric acid, adipic acid, pimelic acid, suberic acid, azelaic acid, sebacic acid, 1,6-decanedicarboxylic acid, 5,6-decanedicarboxylic acid, 1,7-octanedicarboxylic acid, 7-methyl-7-methoxycarbonyl-1,9-decanedicarboxylic acid, 7,9-dimethyl-7,9-dimethoxycarbonyl-1,11-dodecanedicarboxylic acid and 7,8-dimethyl-7,8-dimethoxy carbonyl-1,14-tetradecanedicarboxylic acid; and unsaturated polycarboxylic acids such as maleic acid, fumaric acid and itaconic acid.

Specific examples of the aromatic polycarboxylic acids are phthalic acid, isophthalic acid, terephthalic acid, trimellitic acid and pyromellitic acid.

Specific examples of the alicyclic polycarboxylic acids are hexahydrophthalic acid and tetrahydrophthalic acid such as cyclohexane-1,2-dicarboxylic acid.

Further, examples of above described monocarboxylic acids are aliphatic monocarboxylic acids having 1 to 30 carbon atoms, aromatic monocarboxylic acids and hydroxycarboxylic acids.

Specific examples of the aliphatic monocarboxylic acids are: saturated monocarboxylic acids such as formic acid, propionic acid, butyric acid, isobutyric acid, valeric acid, caproic acid, enanthic acid, caprylic acid, pelargonic acid, lauric acid, myristic acid, stearic acid, behenic acid, malic acid and tartaric acid; and unsaturated monocarboxylic acids such as acrylic acid, methacrylic acid and oleic acid.

Specific examples of the aromatic monocarboxylic acids are benzoic acid, o-nitrobenzoic acid, p-nitrobenzoic acid, cinnamic acid and naphthoic acid.

Specific examples of the hydroxycarboxylic acids are salicyclic acid, mandelic acid and resorcylic acid.

Thirdly, examples of salts of the above described organic and inorganic acids usable according to the embodiment of the present invention are ammonium salts, amine salts and amidine salts of such acids.

Among them, ammonium salts of the acids can be considered to be readily exemplified, so that further specific description of examples thereof is omitted here.

Examples of amines to constitute such amine salts are: primary amine such as methylamine, ethylamine, propylamine, butylamine and ethylene diamine; secondary amine such as dimethylamine, diethylamine, dipropylamine, methyl ethyl amine, diphenylamine and diethanolamine; tertiary amine such as trimethylamine, triethylamine, tripropylamine, triphenylamine and triethanolamine; and quaternary amine such as tetramethylamine, tetraethylamine and tetrapropylamine.

Examples of amidine salts are compounds having amidine group substituted with alkyl group and quaternary compounds of such compounds, e.g. alicyclic amidine compounds, benzoimidazole compounds and imidazole compounds which are modified to quaternary compounds by using alkyl group or arylalkyl group having 1 to 11 carbon atoms.

Specific examples of the quaternary compounds having amidine group substituted with alkyl group are: 1-methyl-1,8-diazobicyclo[5,4,0]undecene-7; 1-methyl-1,5-diazobicyclo [4,3,0]nonene-5; 1,2,3-trimethylimidazolinium; 1,2,3,4-tetramethylimidazolinium; 1,2-dimethyl-3-ethyl-imidazolinium; 1,3,4-trimethyl-2-ethylimidazolinium; 1,3-dimethyl-2-heptylimidazolinium; 1,3-dimethyl-2-(-3'heptyl)imidazolinium; 1,3-dimethyl-2-dodecylimidazolinium; 1,2,3-trimethyl-1,4,5,6-tetrahydropyrimidium; 1,3-dimethylimidazolinium; 1-methyl-3-ethyl-imidazolinium; and 1,3-dimethylbenzoimidazolinium.

The above described organic acids, inorganic acids and salts of such acids are each usable solute. One or a combination of two or more of such solutes can be used to be dissolved in a polar solvent. One of the features of these solutes is in that metal salts are not used as cations therein. That is, they are free of metal salts as cations. Therefore, when they are used for electrolytic capacitors, they can contribute to improvement of resistance to short-circuiting, namely to suppression of short-circuiting in the electrolytic capacitors, while realizing high ionic conductivities of the electrolytes.

Next, regarding ratio in weight of the first monomer to the second monomer as defined above, when they are used together, is preferably in a range between 100:3 and 3:100, more preferably between 100:10 and 10:100. This is because in a range above such upper limit and below such lower limit, it becomes difficult for the first monomer and the second monomer to form a copolymer matrix. Within the preferable range of the weight ratio, the skeleton of the copolymer matrix can be maintained stably, so that the desirable function of the copolymer matrix in the polymer electrolyte composite can be effectively obtained.

With respect to the amount of the copolymer of acrylic derivative in the polymer electrolyte composite, it is preferred that the sum weight of the solute and the copolymer of the acrylic derivative contain the copolymer in an amount of 5 to 50 wt %. When the content of the copolymer is less than 5 wt %, the formation of a crosslinked copolymer matrix and curing can hardly be expected. On the other hand, when its content is more than 50 wt %, an absolute amount of liquid electrolyte to be incorporated in the copolymer matrix becomes undesirably smaller, so that the ionic conductivity of the polymer electrolyte composite becomes too low for resultant electrolytic capacitors to have satisfactory characteristics.

In an electrolytic capacitor made by sandwiching, between an anode foil and a cathode foil, a separator containing a polymer electrolyte composite according to the embodiment of the present invention as described above as a constituent for driving the electrolytic capacitor, it is possible to maintain desired and stable performance even at a high temperature environment for a long time. Such polymer electrolyte composite hardly reacts with electrode foils of e.g. aluminum, and can contribute to making electrolytic capacitors having superior characteristics with respect to e.g. easiness of manufacturing and length of operational life.

Further, in an electrolytic capacitor according to the embodiment of the present invention, the weighting of a separator to be used therein is preferred to be from 0.01 to 55 g/m$^2$. In a range below the lower limit or beyond the upper limit of the weighting, resultant electrolytic capacitors may be likely to suffer short-circuiting or too large dielectric loss.

Such weighting range of 0.01 to 55 g/m$^2$ is comparatively lower than that of separators used in conventional electrolytic capacitors. That is, conventionally, when such a low weighting separator containing a liquid electrolyte or an ion conductive polymer is used in an electrolytic capacitor, it is likely to suffer short-circuiting, so that stable characteristics of the capacitor can hardly be maintained. On the other hand, the combination of such a low weighting separator with the polymer electrolyte composite according to the embodiment of the present invention does not suffer such problem. This is because according to the embodiment of the present invention, a copolymer matrix is spread over in the separator, whereby the physical distance between the anode and the cathode of the electrolytic capacitor can be maintained, and the stability of the withstand voltage of the capacitor can be improved. Thus, according to the embodiment of the present invention, a low weighting separator can be used even for electrolytic capacitors for middle or high rated voltage use, which conventionally requires the use of a high weighting separator.

Examples of materials to be used for the separators according to the embodiment of the present invention are manila paper, kraft paper, hemp paper, nonwoven fabric and porous resin film. Among them, more preferable ones are porous resin film and nonwoven fabric, because these two materials are easier to control in their porosities.

The porosity of the separator is preferably from 10 to 90%. In a range below the lower limit or beyond the upper limit of the weighting, resultant electrolytic capacitors may be likely to suffer short-circuiting or too large dielectric loss.

The usability of such a wide range of porosity is an advantageous feature according to the embodiment of the present invention. That is, in a conventional electrolytic capacitor using a separator containing a liquid electrolyte or an ion conductive polymer, a short-circuiting is likely to occur within such a porosity range of 10 to 90%, depending on the kinds of separator materials of e.g. porous resin films or nonwoven fabrics. On the other hand, the embodiment of the present invention does not suffer such problem within such a porosity range, irrespectively of the kinds of separator materials of e.g. porous resin films or nonwoven fabrics. This is because according to the embodiment of the present invention, a copolymer matrix is spread over in the separator, whereby the physical distance between the anode and the cathode of the electrolytic capacitor can be maintained even with the separator having a wide range of porosity, and the stability of the withstand voltage of the capacitor can be improved, making it possible to obtain superior characteristics of electrolytic capacitors.

Particularly, it is to be noted that the possibility of using a lower weighting and a higher porosity separator allows the separator to be able to have a lower electric resistance. Therefore, it can realize electrolytic capacitors having low equivalent series resistance (ESR) or low impedance.

Here, examples of materials usable for the porous resin films and the nonwoven fabrics are polyethylene resin, polypropylene resin, fluorocarbon resin, polyester resin, polyamide resin, polyurethane resin, styrene resin, polyethylene terephthalate resin, vinyl chloride resin, vinyl carbazole resin, vinylidene chloride resin, vinyl acetate resin, methacrylic resin, polycarbonate resin, polyacetal resin, cellulose resin, phenolic resin, urea resin, melamine resin, guanamine resin, aniline resin, epoxy resin, unsaturated polyester resin, acrylic resin, xylene resin, silicone resin and furan resin.

EXAMPLES

Hereinafter, embodiments of the present invention will more specifically be described by using Examples and Comparative examples for comparison.

Example Group I

[I-1] Materials of Examples 1–17 and Their Characteristics

As examples according to the embodiment of the present invention, 17 kinds of samples, i.e. Examples 1–17, of polymer electrolyte composites were made. Further, 2 kinds of samples, i.e. Comparative examples 1 and 2, of solid electrolytes, for comparison, were made. In total, 19 samples were made in a manner as will be described later. Table 1 lists compositions of such samples and shows their measured characteristics. In this connection, it is to be noted that acrylic derivatives represented by Formula (1) and Formula (5) can be various compounds having various structures. Examples of such various compounds are listed in Table 2 and Table 3. Certain ones of such compounds selected from Tables 2 and 3 were used for making certain samples here as listed in Table 1.

Samples of Examples 1–17 and Comparative examples 1 and 2 were made as follows.

First of all, a method of making the sample of Example 1 will be described hereinbelow as a representative one. Four materials listed in Table 1, in the row of Example 1 and the column of Constituting material, were prepared. They are: ethylene glycol as a polar solvent; ammonium benzoate as a solute; compound represented by Formula (1), specifically No. 1 of Table 2, as a first monomer; and compound represented by Formula (5), specifically No. 11 of Table 5, as a second monomer. These four materials in weight ratios as listed in the column of Composition of Table 1 were mixed, thereby to make a starting liquid of an electrolyte sample, which, more precisely describing, is a polymer electrolyte composite sample. This starting liquid in an amount of 20 g was placed in a petri dish, which was then covered with a lid, and was thereafter heated under a given condition of heating temperature and heating time, to get cured. Thereby, an electrolyte sample of Example 1, more specifically a sample of polymer electrolyte composite having a material and composition of Example 1, was made. Here, an adjustment was made so that the cured sample had 2 wt % of water content.

The ionic conductivity of the thus made sample of Example 1 was measured by using an impedance analyzer. The ionic conductivity as measured was 2.2 mS/cm.

Further, the sparking voltage of the sample of Example 1, i.e. minimum voltage at which spark generation starts between two electrodes placed in the sample, was measured as follows. Firstly, a starting liquid of a polymer electrolyte composite sample was prepared in the same manner as described above. The starting liquid in a given amount was placed in a sealable bottle. An aluminum anode foil and an aluminum cathode foil, each having a dimension of 2 cm×5 cm, were immersed and placed in the starting liquid in-the bottle, with a distance between each other being kept at 1 cm. Here, the aluminum anode foil was prepared by subjecting an aluminum foil to an etching treatment in an aqueous acid etchant and then to an anodic oxidation treatment in an aqueous solution of boric acid with a given forming voltage. Thereby, the aluminum anode foil having a dielectric aluminum oxide film on each of the both major surfaces thereof was made.

Then, the bottle was sealed with the two electrode foils being fixed. By heating the bottle under a given condition of heating temperature and heating time, the starting liquid of polymer electrolyte composite sample was cured. An adjustment was made here as well, so that the cured sample had 2 wt % of water content.

By applying a given voltage across the two electrodes, the sparking voltage, i.e. minimum voltage at which spark generation between the two electrodes started, was measured. The thus measured sparking voltage was 580 V.

Samples of polymer electrolyte composites according to Examples 2–17 and samples of solid electrolytes according to Comparative examples 1 and 2 were made in a manner the same as that used for making the sample of Example 1 as above described. That is, starting liquids, each having an amount of 20 g, for such Examples and Comparative examples having respective constituting materials and compositions as listed in Table 1 were prepared and cured with the water content being adjusted in a manner the same as that described above, whereby samples of polymer electrolyte composites for the Examples and samples of solid electrolytes for the Comparative examples were made. The ionic conductivities of such samples were measured by the same impedance analyzer method. Table 1 shows the results of such measurements.

Furthermore, samples for the same Examples 2–17 and Comparative examples 1 and 2 for sparking voltage measurement were made, each using a sealable bottle, and were subjected to the sparking voltage measurements in a manner the same as that described above with respect to Example 1. Table 1 also shows the results of such measurements.

It is evident from the results shown in Table 1 that the samples of Examples 1–17 have much higher sparking voltages than those of the samples of the Comparative examples 1 and 2, although the samples of Examples 1–17 have a little lower ionic conductivities. This means that the samples of Examples 1–17 have much better characteristics with respect to short-circuiting, and are less likely to suffer short-circuiting than the samples of Comparative examples.

Next, based on the constituting materials of Example 1, the influence of the weight ratio of the first monomer to the second monomer on the formation of copolymer matrix and on the characteristics of ionic conductivity and sparking voltage was studied by varying the weight ratio. That is, eight more samples of polymer electrolyte composites were made in a manner the same as that used for making the sample of Example 1, using the same materials as listed in the column of Constituting material of Table 1, except that here the weight ratio of the first monomer to the monomer was varied in the range between 100:1 and 1:100 as listed in Table 4. The expression used here for expressing the weight ratio is such that one of the two having a larger amount than the other is expressed as 100 weight parts. In Table 4, the fourth row lists the same sample of Example 1 as described above with reference to Table 1. In the row of Example 1 of Table 1, the first monomer and the second monomer are listed as 8 wt % and 2 wt %, respectively, which corresponds to 100:25 in terms of the expression of weight ratio as described above.

The thus made samples were examined as to whether copolymer matrix was formed, and were also subjected to the measurements of ionic conductivity and sparking voltage. Table 4 shows the results of such examination and measurements.

It is evident from Table 4 that in the weight ratio range below 100:3 and beyond 3:100, copolymer matrix was not formed. Table 4 also indicates that the weight ratio range from 100:3 to 3:100 is preferable, more preferably from 100:10 to 10:100, in view of total evaluation of both the ionic conductivity and the sparking voltage.

[I-2] Characteristics of Electrolytic Capacitors using the Electrolytes of Above Examples and Comparative Examples Samples of aluminum electrolytic capacitors of eleven different kinds, each of 20 pieces, were made by using eleven electrolytes selected from among Table 1 as listed in Table 5, namely Examples 1, 4, 5, 7, 8, 9, 12, 14 and 15 and Comparative examples 1 and 2. These capacitor samples were subjected to the measurements of initial characteristics and to life tests.

First of all, a method of making such sample capacitors will be described below with reference to the sample capacitor using the electrolyte, more precisely polymer electrolyte composite, according to Example 1.

A starting liquid of polymer electrolyte composite in accordance with Example 1 was prepared in a manner the same as that described in [I-1] above. Meanwhile, a capacitor precursory body was prepared as follows.

An aluminum foil having a thickness of 100 $\mu$m was etched in an aqueous acid etchant, and was subjected to anodic oxidation in an aqueous solution of boric acid by applying a voltage of 600 V to the aluminum foil. By such process, a dielectric oxide film of aluminum oxide was formed on both major surfaces of the aluminum foil, whereby an anode foil having a given thickness of dielectric aluminum oxide film was made. In addition, a kraft paper, as a separator, having a thickness of 60 $\mu$m and a weighting of 35 g/m², and an aluminum foil, as a cathode foil, having a thickness of 22 $\mu$m were prepared. Then, the kraft paper, the above made anode foil, the kraft paper again and the cathode foil were placed on each other in this order to prepare a foil-paper sandwich. This foil-paper sandwich was wound up in a given number of turns so that the anode and cathode foils face each other with the separators therebetween. Lead wires for electrical connection were then connected to the anode foil and the cathode foil, respectively. Thereby, a capacitor precursory body was made.

Into the thus made capacitor precursory body, the above prepared starting liquid, in a given amount, of polymer electrolyte composite in accordance with Example 1 was impregnated, thereby to make a starting electrolytic capacitor element. The thus made starting electrolytic capacitor element was put in a given aluminum case, and then was sealed with a sealant. Thereafter, the aluminum case was heated to cure the starting liquid of the polymer electrolyte composite in the starting electrolytic capacitor element therein. In this way, a sample of an electrolytic capacitor according to Example 1 was made. In the same way, 19 more samples, in total 20, of electrolytic capacitors according to Example 1 were made. Upon making these 20 samples, adjustments were so made with respect e.g. to the number of turns of the foil-paper sandwich that all the 20 capacitor samples each had a rated voltage-capacitance of 400 WV-470 $\mu$F, where WV denotes working voltage. These 20 samples were each subjected to aging for 1 hour with a voltage of 425 V applied thereto.

Likewise, 20 samples of electrolytic capacitors in accordance with each of Examples 4, 5, 7, 8, 9, 12, 14 and 15 and Comparative examples 1 and 2 were made in a manner the same as that used for making the sample capacitors in accordance with Example 1 as described above, after starting liquids of electrolytes for these eight Examples and two Comparative examples were prepared in the same manner as described in [I-1] above.

The thus made sample capacitors were subjected to the measurements of initial characteristics of capacitances, tan $\delta$ (dielectric loss) and LC (leakage current) using the measuring methods as defined in JIS (Japanese Industrial Standard) C-5102, and then to ripple load test, i.e. aging test under a concurrent DC-ripple load, at 105° C. for 5000 hours. The concurrent DC-ripple load was generated by superimposing a ripple current having a frequency of 60 Hz on a DV voltage in such a manner that the ripple-superimposed DC voltage became the rated voltage.

During the ripple load test, all the sample capacitors according to Comparative examples 1 and 2 were short-circuited.

On the other hand, after the ripple load test for 5000 hours, none of the other samples showed any abnormal change in their outer appearances. Further, after the ripple load test for 5000 hours, all the samples were subjected to the measurements of the capacitances, tan $\delta$ and LC by again using the measuring methods as defined in JIS-C-5102.

Table 5 shows all the characteristics according to the measurements as described above, in which with respect to capacitances, they are shown by $\Delta$C, i.e. change rate of capacitances from initial capacitances to those after the ripple load test. Here, each value shown in Table 5 is an average of each group of 20 samples as made above. For example, in the case of the 20 sample capacitors according to Example 1, the initial tan $\delta$ and LC in average were 4.6% and 20 $\mu$A respectively, and those at 5000 hours after the ripple load test were 6.8% and 11 $\mu$A respectively, and the capacitance change rate $\Delta$C was -0.6%.

As apparent from the results shown in Table 5, all the samples of Comparative examples 1 and 2 were short-circuited, whereby normal electrolytic capacitors could not be made. On the other hand, it is apparent that in the sample capacitors of Examples 1, 4, 5, 7, 8, 9, 12, 14 and 15, initial characteristics were kept stable, and they did not experience short-circuiting or open failure even after the 105° C. ripple load test. Thus, it is evident that the polymer electrolyte composite for driving electrolytic capacitors according to the embodiment of the present invention, which composite comprises a copolymer matrix of acrylic derivative, has a superior effect in the heat resistance property as well.

Example Group II

[II-1] Materials of Examples 18–30 and Their Characteristics

As examples according to the embodiment of the present invention, 13 more kinds of samples, i.e. Examples 18–30, of polymer electrolyte composites were made. Further, one kind of sample, i.e. Comparative example 3, of solid electrolyte and two kinds of samples, i.e. Comparative examples 4 and 5, of liquid electrolytes for comparison were made. In total, 16 kinds of samples were made. Table 6 lists materials and compositions of such samples and shows their measured characteristics. As apparent from Table 6, compounds represented by Formulas (1) to (5), (7), (8), (13), (14) and (16) were used for certain samples of this Example Group II as listed in Table 1. Among them, regarding the materials of Formulas (1) and (5), certain acrylic derivatives selected from Table 2 and Table 3 were used here like the case of Example Group I as described in [I-1] above, and are listed in Table 1.

The samples of electrolytes of Examples 18–30 and Comparative examples 3–5 were made in a manner the same as that described in [I-1] above. That is, the materials listed in the column of Constituting material and respective rows of Table 6 were mixed in the respective weight rations listed in the column of Composition thereof to make respective starting liquids of electrolytes. Each of the starting liquids in an amount of 20 g was placed in a petri dish, which was then covered with a lid, and was thereafter heated under a given condition of heating temperature and heating time, to get cured. Thereby, respective 16 samples of electrolytes were made. Here, with respect to Examples 18–25 and Comparative example 3, an adjustment was made so that each of the resultant samples had 2 wt % of water content just as in the case of [I-1] above. On the other hand, with respect to Examples 26–30 and Comparative examples 4 and 5, which contain boric acid materials, an adjustment was made so that each of the resultant samples had 25 wt % of water content.

The ionic conductivities of the thus made 16 samples of electrolytes were measured by using an impedance analyzer. Furthermore, the sparking voltages of the same 16 samples were measured by the same measuring method as described above in the Example Group I, using the sealable bottle. Table 6 shows the thus measured characteristics. For example, in the case of the sample of Example 18, which more specifically is of polymer electrolyte composite, the ionic conductivity was 1.2 mS/cm, and the sparking voltage was 550 V.

It is evident from the results shown in Table 6 that the sparking voltages of the samples of electrolytes according to Examples 18–30 are very much improved over Comparative examples 3–5, even though the solvents and the solutes used in the Examples may be the same as those used in the Comparative examples.

Although not shown in Table 6, it was also confirmed that similarly superior results could be obtained by using, as a second monomer, other compounds of acrylic derivative, i.e. those represented by Formulas (6), (9), (10), (11), (12) and (15) in combination with the first monomer.

[II-2] Characteristics of Electrolytic Capacitors using the Electrolytes of Above Examples and Comparative Examples Samples of aluminum electrolytic capacitors of twentythree different kinds, each of 20 pieces, were made by using thirteen electrolytes selected from among Table 1 and Table 6 as listed in Table 7 and Table 8, namely Examples 4, 18, 19, 22, 24, Comparative example 3, Examples 26–30 and Comparative examples 4 and 5. These capacitor samples were subjected to the measurements of initial characteristics and to life tests.

Among them, the sample capacitors as listed in Table 7 were made in a manner the same as that used for making the sample capacitors of Example Group I as described in [I-2], except: that here the used constituting materials were those listed in Table 1 and Table 6 with the corresponding Example numbers in Table 7; that manila paper was used here in place of the kraft paper, and the weighting of the manila paper was varied; that the applied voltage for anodic oxidation here was 300 V in place of 600 V; and that in correspondence with the change of the applied voltage for anodic oxidation, the rated voltage-capacitance of the capacitor samples was changed to 160 WV-330 $\mu$F from 400 WV-470 $\mu$F. It is to be noted here that the weighting of a material is defined to be a product of the density and the thickness of the material.

Meanwhile, the sample capacitors as listed in Table 8 were also made in a manner the same as that used for making the sample capacitors of Example Group I as described in [I-2], except: that here the used constituting materials were those listed in Table 6 with the corresponding Example numbers in Table 8; that except for the Comparative example 5, porous resin films having various porosities were used as separators in place of the kraft paper, and the thickness of each separator was 40 $\mu$m in place of 60 $\mu$m; and that the rated voltage-capacitance of the capacitor samples was changed to 400 WV-330 $\mu$F from 400 WV-470 $\mu$F. It is to be noted here that the porosity of a material is defined as [1−(actual density of the material/true density of the material)]×100.

The thus made sample capacitors were subjected to the measurements of initial characteristics of capacitances, tan $\delta$ (dielectric loss) and LC (leakage current) using the measuring methods as defined in JIS (Japanese Industrial Standard) C-5102. Thereafter, the sample capacitors were subjected to a DC load test, i.e. aging test under DC load, for 5000 hours in a manner similar to that described in [I-2] above, except that here the temperature, for the DC load test was set to be 125° C. in the case of Table 7 and 95° C. in the case of Table 8 in place of 105° C., and that a simple DC load of rated voltage was used as the DC load in place of the concurrent DC-ripple load. After the DC load test for 5000 hours, all the samples were subjected to the measurements of the capacitances, tan $\delta$ and LC by again using the measuring methods as defined in JIS-C-5102.

Table 7 and Table 8 show all the characteristics according to the measurements as described above, in which with respect to capacitances, they are shown by $\Delta$C, i.e. change rate of capacitances from initial capacitances to those after the DC load test. Here, each value shown in Table 7 and Table 8 is an average of each group of 20 samples as made above.

For example, in the case of the 20 sample capacitors according to Example 18 in Table 7, which used a separator having a weighting of 12.0 g/m$^2$ and a density of 0.3 g/cm$^3$, the initial tan $\delta$ and LC in average were 2.9% and 30 $\mu$A respectively, and those after the 5000 hours DC load test at 125° C. were 6.1% and 13 $\mu$A respectively, and the capacitance change rate $\Delta$C was −0.8%. None of the 20 sample capacitors according to Example 18 showed any abnormal outer appearances after the DC load test.

Further, in the case of the 20 sample capacitors according to Example 26 in Table 8, for example, which used a separator of polyethylene resin film having a porosity of 40% and a density of 0.3 g/cm$^3$, the initial tan $\delta$ and LC in average were 24.1% and 24 $\mu$A respectively, and those after the 5000 hours DC load test at 95° C. were 6.7% and 9 $\mu$A respectively, and the capacitance change rate $\Delta$C was −0.6%.

None of the 20 sample capacitors according to Example 26 showed any abnormal outer appearances after the DC load test.

It is apparent from the results shown in Table 7 and Table 8 that the sample capacitors of the Examples according to the embodiment of the present invention are remarkably superior to the sample capacitors of the Comparative examples, although some of the sample capacitors of the Examples according to the embodiment of the present invention may have some electric characteristics comparable to those of the Comparative examples. For example, in the case of Comparative example 3 using a separator having a relatively lower weighting and in the case of Comparative example 4 using a porous resin film separator having a porosity of 25%, all the sample capacitors thereof were short-circuited during the DC load test at high temperatures, whereas the sample capacitors according to the embodiment of the present invention were stable.

Further, in the case of Comparative example 5 using a kraft paper as separator, the capacitance change rate was very high, although it did not experience short-circuiting, whereas the sample capacitors according to the embodiment of the present invention could maintain stable characteristics even after the load test.

It is also evident from Table 7 that when the weighting of the separators was in a range of 0.01 to 55 g/m², the sample capacitors according to the embodiment of the present invention showed good characteristics, whereas in a range below the lower limit or beyond the upper limit of the weighting, such sample capacitors suffered short-circuiting or too large tan δ.

It is still further evident from Table 8 that when the porosity of the separators of porous resin films was in a range of 10 to 90%, the sample capacitors according to the embodiment of the present invention showed good characteristics, whereas in a range below the lower limit or beyond the upper limit of the weighting, such sample capacitors suffered short-circuiting or too large tan δ. Although not shown by specific examples here, it was also confirmed that good characteristics could be obtained by using nonwoven fabrics in place of porous resin films, when the porosity of the nonwoven fabrics was in the range of 10 to 90%.

In view of the above results, it is evident that as compared with conventional liquid electrolytes, the polymer electrolyte composites according to the embodiment of the present invention can realize sufficiently smaller values of tan δ, ESR and impedance by using lower weighting and/or higher porosity separators, although the polymer electrolyte composites may have lower ionic conductivities than the conventional liquid electrolytes.

Furthermore, in order to more readily evaluate the results shown in Table 5, Table 7 and Table 8, five sample capacitors were disassembled after the load test. The disassembled five sample capacitors were those according to Examples 1 and 4 of Table 5, Example 18 of Table 7, Example 26 of Table 8, third row, using the polyethylene resin separator having a porosity of 40%, and the Comparative example 5 of Table 8. Then, the outer appearances of the cathode foils of these five sample capacitors were observed, and the capacitances of such cathode foils were measured and compared with their respective initial capacitances having been measured preliminarily. Table 9 shows the results thereof.

As apparent from Table 9, the cathode foil in the sample capacitor of Comparative example 5 was changed in color to black, and decreased in the capacitance thereof to about half of the initial value. On the other hand, the cathode foils according to the Examples 1, 4, 18 and 26 showed no abnormal change in their outer appearances, and little change in their capacitances, which indicate that the sample capacitors according to these Examples had high withstand voltages. It was thus confirmed that the polymer electrolyte composites according to the embodiment of the present invention could protect cathode foil surfaces even at high temperature environment, and therefore could contribute to the provision of electrolytic capacitors having a long life even at high temperatures.

Lastly, the method of evaluating the capability of reforming anode foils in sample capacitors will be described with reference to FIG. 2 by using the case of the sample capacitors of Examples 1, 4 and 5 of Table 5 and Example 18 of Table 7.

An open circuit voltage of 800 V was applied between the anode and the cathode of each of the sample capacitors with an electric current therebetween being set to be 2 mA/10 cm². Thereby, the actual voltage therebetween gradually increased, which indicate that the electric current functioned to reform the anode foil of each sample capacitor. The voltage increased until the reforming became unable to be made any longer at a certain time point after the start of the voltage application. By continuing the voltage application even thereafter, sparks started to be generated between the anode and the cathode of the sample capacitor.

Figure 2:
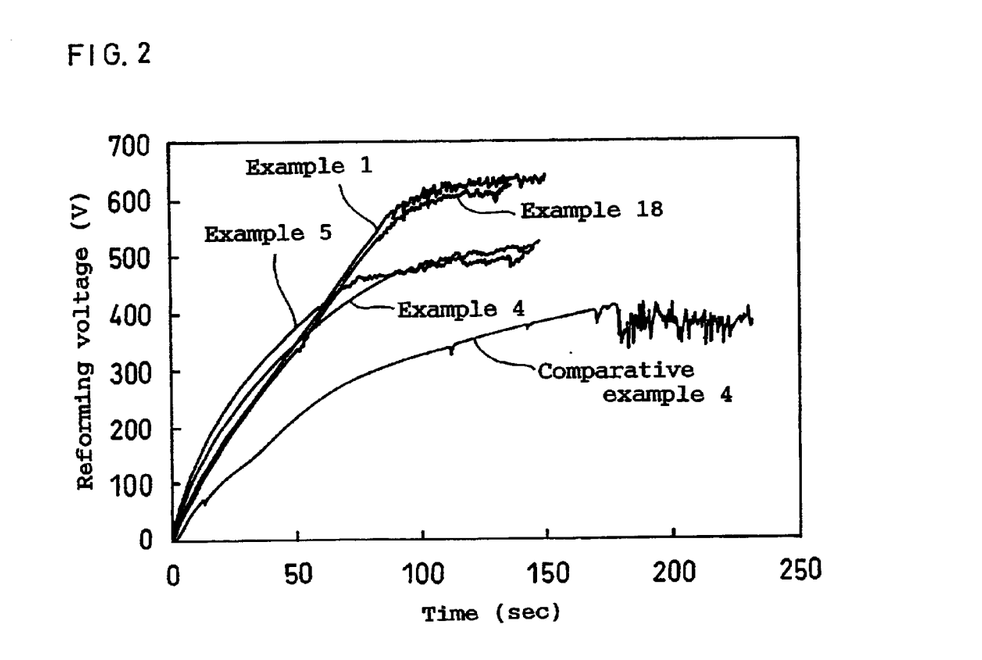
FIG. 2 is a graph showing how reforming voltages as to sample capacitors of Examples of the present invention and of Comparative Example increase with time, when a test voltage is applied to such sample capacitors, so as to show differences in the capability of reforming anode foils and sparking voltages of such sample capacitors.

FIG. 2 is a graph showing how the reforming voltage as above described increased with time with respect to each of the five sample capacitors. For example, with reference to the curve of the sample capacitor of Example 1 in FIG. 2, the reforming could continue to a voltage of about 580 V, above which the curve started fluctuation, which means that 580 V was sparking voltage thereof. Likewise, with reference to the curve of Comparative example 4, the reforming could continue to a voltage of about 410 V, which was the sparking voltage thereof.

As apparent from FIG. 2, the sample capacitors according to the embodiment of the present invention have at least 100 V higher reforming capabilities as compared with the sample capacitor according to the Comparative example. This indicates that according to the embodiment of the present invention, short-circuiting is less likely to occur, and consequently that the superior life of capacitors can be obtained even with the use of lower weighting and/or higher porosity separators.

TABLE 1

| | Constituting material | Composition (wt %) | Ionic conductivity (mS/cm) | Sparking voltage (V) |
|---|---|---|---|---|
| Example 1 | ethylene glycol | 80 | 2.2 | 580 |
| | ammonium benzoate | 10 | | |
| | Formula(1), Table2, No. 1 | 8 | | |
| | Formula(5), Table3, No. 11 | 2 | | |

TABLE 1-continued

|  | Constituting material | Composition (wt %) | Ionic conductivity (mS/cm) | Sparking voltage (V) |
|---|---|---|---|---|
| Example 2 | ethylene glycol | 80 | 2.1 | 480 |
|  | ammonium benzoate | 10 |  |  |
|  | Formula(1), Table2, No. 2 | 8 |  |  |
|  | Formula(5), Table3, No. 11 | 2 |  |  |
| Example 3 | ethylene glycol | 80 | 2.0 | 480 |
|  | ammonium benzoate | 10 |  |  |
|  | Formula(1), Table2, No. 3 | 8 |  |  |
|  | Formula(5), Table3, No. 11 | 2 |  |  |
| Example 4 | ethylene glycol | 78 | 2.0 | 460 |
|  | diammonium azelate | 10 |  |  |
|  | Formula(1), Table2, No. 1 | 10 |  |  |
|  | Formula(5), Table3, No. 12 | 2 |  |  |
|  | Formula(16), $R^1$: —$CH_3$, n = 1 | 0.02 |  |  |
| Example 5 | ethylene glycol | 76 | 3.2 | 458 |
|  | diammonium maleate | 10 |  |  |
|  | Formula(2), $R^1$: —$CH_3$, n = 1 | 12 |  |  |
|  | Formula(6), $R^3$: —$CH_3$ | 2 |  |  |
| Example 6 | ethylene glycol | 76 | 3.6 | 300 |
|  | tetramethyl amine | 10 |  |  |
|  | Formula(2), $R^1$: —$CH_3$, n = 1 | 12 |  |  |
|  | Formula(6), $R^3$: —$CH_3$ | 2 |  |  |
| Example 7 | ethylene glycol | 8 | 20 | 265 |
|  | water | 70 |  |  |
|  | diammonium adipate | 10 |  |  |
|  | Formula(3), $R^1$: —$CH_3$ | 10 |  |  |
|  | Formula(5), Table3, No. 12 | 2 |  |  |
| Example 8 | ethylene glycol | 70 | 3.1 | 420 |
|  | diammonium adipate | 10 |  |  |
|  | Formula(1), Table2, No. 9 | 15 |  |  |
|  | Formula(5), Table3, No. 13 | 5 |  |  |
| Example 9 | ethylene glycol | 66 | 2.4 | 465 |
|  | ammonium 1,7-octanedicarboxylate | 10 |  |  |
|  | Formula(4), $R^1$: —$CH_3$, n = 1 | 22 |  |  |
|  | Formula(5), Table3, No. 12 | 2 |  |  |
|  | Formula(16), $R^1$: —$CH_3$ n = 1 | 0.01 |  |  |
| Example 10 | sulfolane | 64 | 2.6 | 320 |
|  | ammonium 1,7-octanedicarboxylate | 12 |  |  |
|  | Formula(4), $R^1$: —$CH_3$, n = 1 | 22 |  |  |
|  | Formula(5), Table3, No. 12 | 2 |  |  |
|  | Formula(16), $R^1$: —$CH_3$, n = 1 | 0.01 |  |  |
| Example 11 | ethylene glycol | 66 | 2.5 | 420 |
|  | ammonium 1,7-octanedicarboxylate | 10 |  |  |
|  | Formula(4), $R^1$: —$CH_3$, n = 1 | 22 |  |  |
|  | Formula(5), Table3, No. 12 | 2 |  |  |
|  | Formula(16), $R^1$: —$CH_3$, n = 2 | 0.01 |  |  |
| Example 12 | ethylene glycol | 78 | 2.5 | 420 |
|  | ammonium 1,6-decanedicarboxylate | 10 |  |  |
|  | Formula(2), $R^1$: —$CH_3$, n = 1 | 10 |  |  |
|  | Formula(9), $R^1$: —$CH_3$ | 2 |  |  |
| Example 13 | ethylene glycol | 78 | 2.3 | 430 |
|  | ammonium 1,6-decanedicarboxylate | 10 |  |  |
|  | Formula(2), $R^1$: —$CH_3$, n = 1 | 10 |  |  |
|  | Formula(15), $R^1$: —$CH_3$ $R^4$: —$C_2H_4O$, n = 2 | 2 |  |  |
| Example 14 | ethylene glycol | 77 | 2.0 | 470 |
|  | ammonium benzoate | 10 |  |  |
|  | Formula(3), $R^1$: —$CH_3$, | 12 |  |  |
|  | Formula(10), $R^1$: —$CH_3$ | 1 |  |  |
| Example 15 | ethylene glycol | 80 | 2.5 | 460 |
|  | ammonium benzoate | 10 |  |  |
|  | Formula(1), Table2, No. 1 | 9 |  |  |
|  | Formula(14), $R^1$: —$CH_3$, $R^4$: —$(CH_2)_6$— | 1 |  |  |
| Example 16 | ethylene glycol | 80 | 2.4 | 450 |
|  | ammonium benzoate | 10 |  |  |
|  | Formula(1), Table2, No. 1 | 9 |  |  |
|  | Fonnula(11), $R^1$: —$CH_3$ | 1 |  |  |
| Example 17 | ethylene glycol | 80 | 2.1 | 450 |
|  | ammonium benzoate | 10 |  |  |
|  | Formula(1), Table2, No. 1 | 9 |  |  |
|  | Formula(12), $R^1$: —$CH_3$, n = 2 $R^4$: —$C_2H_4O$, n = 2 | 1 |  |  |

TABLE 1-continued

| | Constituting material | Composition (wt %) | Ionic conductivity (mS/cm) | Sparking voltage (V) |
|---|---|---|---|---|
| Comparative example 1 | polyethylene oxide lithium cobaltate | 90 10 | 0.003 | 50 |
| Comparative example 2 | ethylene glycol ammonium azelate alkyl cellulose | 75 10 15 | 2.3 | 100 |

TABLE 2

Examples of compounds represented by Formula (1)

| | | $AO^1$ | |
|---|---|---|---|
| No. | $R^1$ | $AO^1$ (Number of added molecules) polymerization state | Mw (Molecular weight) |
| 1 | $CH_3$— | EO (1.0) — | 130 |
| 2 | $CH_3$— | EO (2.0) — | 174 |
| 3 | $CH_3$— | EO (4.5) — | 284 |
| 4 | H— | EO/PO (3.5/2.5) random | 363 |
| 5 | $CH_3$— | EO (8.0) — | 420 |
| 6 | $CH_3$— | EO/TMO (8.4/2.7) random | 600 |
| 7 | $CH_3(CH_2)_2$— | EO/PO (14.8/6.0) block | 1100 |
| 8 | $CH_3$— | EO/PO (85.2/15.5) random | 4700 |
| 9 | $CH_3$— | EO (8.0) — | 500 |

TABLE 3

Examples of compounds represented by Formula (5)

| | | $AO^2$ | |
|---|---|---|---|
| No. | Terminal $R^3$ | $AO^2$ (Number of added molecules) polymerization state | Mw (Molecular weight) |
| 10 | $CH_3$— | EO (2) — | 242 |
| 11 | $CH_3$— | EO (4) — | 330 |
| 12 | $CH_3$— | EO (9) — | 466 |
| 13 | $C_3H_7$— | EO/BO (51.1/10.4) random | 3000 |
| 14 | H— | EO/PO (11.9/16.8) block | 1700 |
| 15 | $CH_3$— | EO (13) — | 726 |
| 16 | $C_2H_5$— | EO/PO (14.6/6.0) random | 1000 |

TABLE 4

| $1^{st}$ monomer: $2^{nd}$ monomer (Weight ratio) | Formation of copolymer matrix | Ionic conductivity (mS/cm) | Sparking voltage (V) |
|---|---|---|---|
| 100:1 | No | — | — |
| 100:3 | Yes | 2.5 | 540 |
| 100:10 | Yes | 2.3 | 560 |
| 100:25 | Yes | 2.2 | 580 |
| (Example 1) | | | |
| 100:50 | Yes | 2.1 | 580 |
| 50:100 | Yes | 2.0 | 580 |
| 10:100 | Yes | 1.9 | 590 |
| 3:100 | Yes | 1.6 | 590 |
| 1:100 | No | — | — |

TABLE 5

Test results of sample capacitors of 400WV470 μF

| | Initial characteristics | | Characteristics at 5,000 H by 105° C. DC load test | | | |
|---|---|---|---|---|---|---|
| | tan δ (%) | LC (μA) | ΔC (%) | tan δ (%) | LC (μA) | Outer appearance |
| Example 1 | 4.6 | 20 | −0.6 | 6.8 | 11 | Normal |
| Example 4 | 4.6 | 21 | −0.2 | 7.0 | 10 | |
| Example 5 | 4.5 | 25 | −0.8 | 7.2 | 13 | |
| Example 7 | 4.5 | 22 | −0.6 | 7.0 | 12 | |
| Example 8 | 4.6 | 25 | −0.5 | 6.9 | 12 | |
| Example 9 | 4.7 | 17 | −0.5 | 7.0 | 12 | |
| Example 12 | 4.6 | 19 | −0.5 | 7.2 | 10 | |
| Example 14 | 4.6 | 22 | −0.5 | 7.2 | 11 | |
| Example 15 | 4.5 | 21 | −0.6 | 7.3 | 12 | |
| Comparative example 1 | All 20 samples short-circuited during aging | | | | | |
| Comparative example 2 | | | | | | |

TABLE 6

| | Constituting material | Composition (wt %) | Ionic conductivity (mS/cm) | Sparking voltage (V) |
|---|---|---|---|---|
| Example 18 | ethylene glycol | 75 | 1.2 | 550 |
| | ammonium sebacate | 10 | | |
| | Formula(1), Table2, No. 3 | 10 | | |
| | Formula(5), Table3, No. 12 | 5 | | |
| Example 19 | γ-butyrolactone | 85 | 2.0 | 410 |
| | 1,2,3,4-tetramethyl immidazolinium phthalate | 10 | | |
| | Formula(1), Table2, No. 1 | 10 | | |
| | Formula(4), $R^1$: —$CH_3$, n = 1 | 2 | | |
| | Formula(5), Table3, No. 11 | 3 | | |
| Example 20 | propylene carbonate | 75 | 2.8 | 280 |
| | 1,2,3,4-tetramethyl immidazolinium phthalate | 10 | | |
| | Formula(1), Table2, No. 4 | 10 | | |
| | Formula(4), $R^1$: —$CH_3$, n = 1 | 2 | | |
| | Formula(5), Table3, No. 11 | 3 | | |
| Example 21 | γ-butyrolactone | 70 | 2.5 | 350 |
| | 1-methyle-3-ethyl-immidazolinium | 15 | | |
| | Formula(1), Table2, No. 4 | 10 | | |
| | Formula(4), $R^1$: —$CH_3$, n = 1 | 2 | | |
| | Formula(5), Table3, No. 11 | 3 | | |
| Example 22 | γ-butyrolactone | 75 | 2.4 | 405 |
| | hydrogen monomethyl triethyl ammonium maleate | 10 | | |
| | Formula(1), Table2, No. 9 | 10 | | |
| | Formula(8), $R^1$: —$CH_3$, $R^2$: —$CH_3$ 1 = 2, m = 2, n = 2 | 5 | | |
| Example 23 | γ-butyrolactone | 73 | 3.0 | 350 |
| | trimethyle amine | 12 | | |
| | Formula(1), Table2, No. 3 | 10 | | |
| | Formula(8), $R^1$: —$CH_3$, $R^2$: —$CH_3$ 1 = 2, m = 2, n = 2 | 5 | | |
| Example 24 | ethylene glycol | 75 | 2.2 | 470 |
| | hydrogen monomethyl triethyl ammonium phthalate | 10 | | |
| | Formula(2), $R^1$: —$CH_3$, n = 1 | 10 | | |
| | Formula(8), $R^1$: —$CH_3$, $R^2$: —$CH_3$ | 3 | | |
| | Formula(5), Table3, No. 11 | 2 | | |
| | Formula(16), $R^1$: —$CH_3$, n = 1 | 0.01 | | |
| Example 25 | ethylene glycol | 70 | 2.8 | 320 |
| | propyl amine | 15 | | |
| | Formula(2), $R^1$: —$CH_3$, n = 1 | 10 | | |
| | Formula(7), $R^1$: —$CH_3$, $R^1$: —$CH_3$ | 3 | | |
| | Formula(5), Table3, No. 11 | 2 | | |
| | Formula(16), $R^1$: —$CH_3$, n = 1 | 0.01 | | |
| Example 26 | ethylene glycol | 69 | 0.5 | 530 |
| | ammonium borate | 20 | | |
| | Formula(2), $R^1$: —$CH_3$, n = 1 | 10 | | |
| | Formula(8), $R^1$: —$CH_3$ | 1 | | |
| Example 27 | ethylene glycol | 70 | 0.6 | 520 |
| | ammonium borate | 15 | | |
| | Formula(1), Table2, No. 9 | 12 | | |
| | Formula(8), $R^1$: —$CH_3$, $R^2$: —$CH_3$ 1 = 2, m = 2, n = 2 | 3 | | |
| Example 28 | ethylene glycol | 70 | 0.6 | 550 |
| | ammonium borate | 15 | | |
| | Fonnula(3), $R^1$: —$CH_3$ | 12 | | |
| | Formula(5), Table3, No. 15 | 3 | | |
| Example 29 | ethylene glycol | 60 | 0.8 | 540 |
| | ammonium borate | 25 | | |
| | Formula(1), Table2, No. 3 | 13 | | |
| | Formula(14), $R^1$: —$CH_3$, $R^4$: —$(CH_2)_6$— | 2 | | |
| Example 30 | ethylene glycol | 71 | 0.6 | 550 |
| | ammonium borate | 15 | | |
| | Formula(4), $R^1$: —$CH_3$, n = 1 | 2 | | |
| | Formula(1), Table2, No. 3 | 10 | | |
| | Formula(13), $R^1$: —$CH_3$, $R^4$: —$(CH_2)_6$— | 2 | | |
| Comparative example 3 | ethylene glycol | 70 | 0.8 | 450 |
| | ammonium 1,7-octanedicarboxylate | 10 | | |
| | β-1,3-glucan | 10 | | |
| | alkyl cellulose | 10 | | |

TABLE 6-continued

| | Constituting material | Composition (wt %) | Ionic conductivity (mS/cm) | Sparking voltage (V) |
|---|---|---|---|---|
| Comparative example 4 | ethylene glycol<br>ammonium borate<br>boric acid<br>polyethylene glycol<br>(molecular weight: 1,000) | 78<br>10<br>7<br>5 | 0.8 | 410 |
| Comparative example 5 | ethylene glycol<br>ammonium borate<br>polyethylene glycol<br>(molecular weight: 1,000) | 75<br>15<br>10 | 0.9 | 500 |

TABLE 7

Test results of sample capacitors of 160WV330 μF

| | Initial characteristics | | Weighting of separator (g/m$^2$) | Characteristics at 5,000 H by 125° C. DC load test | | | |
|---|---|---|---|---|---|---|---|
| | tan δ (%) | LC (μA) | | ΔC (%) | tan δ (%) | LC (μA) | Notes |
| Example 4 | 20.0 | 30 | 70.0 | −1.0 | 30.0 | 14 | Too large tan δ |
| Example 4 | 10.0 | 30 | 55.0 | −1.0 | 17.0 | 14 | Normal outer appearance |
| Example 4 | 4.5 | 35 | 30.0 | −1.0 | 8.0 | 13 | |
| Example 18 | 2.9 | 30 | 12.0 | −0.8 | 6.1 | 13 | |
| Example 19 | 3.1 | 31 | 3.0 | −0.7 | 6.3 | 12 | |
| Example 22 | 2.9 | 30 | 1.5 | −0.8 | 6.4 | 12 | |
| Example 24 | 2.1 | 29 | 0.1 | −0.6 | 6.3 | 11 | |
| Example 4 | 1.9 | 28 | 0.01 | −0.5 | 6.0 | 12 | |
| Example 4 | 1.5 | 29 | 0.005 | All sample capacitors short-circuited | | | |
| Comparative example 3 | 8.0 | 30 | 32.5 | | | | |

TABLE 8

Test results of sample capacitors of 400WV330 μF

| | Initial characteristics | | Porous separator (Porosity) | Characteristics at 5,000 H by 95° C. DC load test | | | |
|---|---|---|---|---|---|---|---|
| | tan δ (%) | LC (μA) | | ΔC (%) | tan δ (%) | LC (μA) | Notes |
| Example 26 | 20.0 | 24 | Polyethylene resin (5%) | −1.5 | 35.0 | 18 | Too large tan δ |
| Example 26 | 18.0 | 23 | Polyethylene resin (10%) | −1.0 | 25.0 | 17 | Normal outer appearance |
| Example 26 | 4.1 | 24 | Polyethylene resin (40%) | −0.6 | 6.7 | 9 | |
| Example 26 | 4.5 | 25 | Polyethylene resin (50%) | −1.2 | 8.0 | 19 | |
| Example 26 | 3.2 | 22 | Polyethylene resin (70%) | −1.1 | 5.5 | 17 | |
| Example 26 | 2.9 | 25 | Polyethylene resin (90%) | −1.0 | 5.0 | 18 | |
| Example 26 | 2.2 | 24 | Polyethylene resin (95%) | All sample capacitors short-circuited | | | |
| Example 27 | 4.2 | 26 | Polyethylene resin (30%) | −0.5 | 6.9 | 10 | Normal outer appearance |
| Example 28 | 4.1 | 30 | Polyester resin (40%) | −0.5 | 7.1 | 9 | |
| Example 29 | 4.3 | 25 | Polypropylene resin (50%) | −0.5 | 7.1 | 10 | |
| Example 30 | 3.9 | 25 | Polyethylene terephthalate resin (40%) | −0.5 | 7.2 | 9 | |
| Comparative example 4 | 6.1 | 25 | Polyethylene resin (25%) | All sample capacitors short-circuited | | | |
| Comparative example 5 | 8.1 | 22 | Kraft paper (25%) | −3.8 | 20.2 | 11 | Normal outer appearance |

TABLE 9

Evaluation of capacitance and cathode foil appearance (voltage withstandability)

| | Capacitance in ratio to initial capacitance of 1 | Outer appearance of cathode foil |
|---|---|---|
| Example 1 | 0.93 | Normal |
| Example 4 | 0.93 | |
| Example 18 | 0.92 | |
| Example 26 | 0.95 | |
| Comparative example 5 | 0.48 | Color changed to black |

Although sample capacitors having been described in the above Example Groups I and II are those using certain materials selected from among Examples 1–30, it was also confirmed that similarly good and superior characteristics could be obtained by using other materials from among such Examples. Furthermore, it was also confirmed that similarly good and superior characteristics could be obtained by using the materials of the Examples of 1–30 for electrolytic capacitors for rated voltages of 4 to 100 WV.

In view of the foregoing, it is evident that the polymer electrolyte composite for driving electrolytic capacitors according to the present invention has improved characteristics over those of conventional liquid electrolytes with respect to suppression of liquid leakage and heat withstandability, and also has much improved characteristics over conventional ion conductive polymers with respect to suppression of short-circuiting owing to e.g. the feature that the polymer electrolyte composite is free of metal ions as cations. Here, the polymer electrolyte composite according to the present invention is a composite body comprising an electrolyte and an acrylic polymer containing a copolymer of acrylic derivative, wherein the electrolyte comprises a polar solvent and a solute comprising at least one of inorganic acids, organic acids and salts of such acids, wherein the copolymer of acrylic derivative is a polymer of: a first monomer of at least one of a group of monofunctional monomers of acrylic derivatives each having at least one hydroxyl group at a terminal thereof and a polymerizable unsaturated double bond; and a second monomer of at least one of a group of multifunctional monomers of acrylic derivatives each having plural polymerizable unsaturated double bonds.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A polymer electrolyte composite comprising an electrolyte and an acrylic polymer containing a copolymer of acrylic derivative, wherein said electrolyte comprises a polar solvent and a solute comprising at least one of inorganic acids, organic acids and salts of both of said acids, and wherein said copolymer of acrylic derivative is a polymer of: a first monomer of at least one of a group of monofunctional monomers of acrylic derivatives each having at least one hydroxyl group at a terminal thereof and a polymerizable unsaturated double bond; and a second monomer of at least one of a group of multifunctional monomers of acrylic derivatives each having plural polymerizable unsaturated double bonds.

2. The polymer electrolyte composite according to claim 1, wherein said copolymer of acrylic derivative constitutes a copolymer matrix, and said electrolyte is incorporated in said copolymer matrix.

3. The polymer electrolyte composite according to claim 1, wherein said copolymer of acrylic derivative contains a polyoxylalkylene group.

4. The polymer electrolyte composite according to claim 1, wherein said solute is free of metal salts as cations.

5. The polymer electrolyte composite according to claim 1, wherein said solute comprises at least one salt selected from the group consisting of ammonium salts, amine salts and amidine salts.

6. The polymer electrolyte composite according to claim 1, wherein said at least one of a group of monofunctional monomers are acrylic derivatives expressed by the following Formulas (1) to (4), and said at least one of a group of multifunctional monomers are acrylic derivatives expressed by the following Formulas (5) to (16):

(1)

where $R^1$ is H or an alkyl group having 1 to 5 carbon atoms, $AO^1$ is an oxyalkylene group having 2 to 4 carbon atoms, and n is 1 to 200, on average, of oxyalkylene group having 2 to 4 carbon atoms;

(2)

where $R^1$ is H or an alkyl group having 1 to 5 carbon atoms, and n is 1 to 200, on average, of oxyalkylene group having 2 carbon atoms;

(3)

where $R^1$ is H or an alkyl group having 1 to 5 carbon atoms;

(4)

where $R^1$ is H or an alkyl group having 1 to 5 carbon atoms, and n is 1 to 200, on average, of oxyalkylene group having 2 carbon atoms;

(5)

where $R^3$ is H or an alkyl group having 1 to 5 carbon atoms, $AO^2$ is an oxyalkylene group having 2 to 4 carbon atoms, and n is 1 to 200, on average, of oxyalkylene group having 2 to 4 carbon atoms;

(6)

where $R^3$ is H or an alkyl group having 1 to 5 carbon atoms;

(7)

where $R^1$ and $R^2$ are each independently H or an alkyl group having 1 to 5 carbon atoms;

(8)

where $R^1$ and $R^2$ are each independently H or an alkyl group having 1 to 5 carbon atoms; and l, m and n are each 1 to 200, on average, of oxyalkylene group having 2 carbon atoms;

(9)

where $R^1$ is H or an alkyl group having 1 to 5 carbon atoms;

(10)

where $R^1$ is H or an alkyl group having 1 to 5 carbon atoms;

(11)

where $R^1$ is H or an alkyl group having 1 to 5 carbon atoms;

(12)

where $R^1$ is H or an alkyl group having 1 to 5 carbon atoms, $R^4$ is $-(CH_2)_n-$, $-(C_2H_4O)_n-$ or and n is 1 to 19, (13)

where $R^1$ is H or an alkyl group having 1 to 5 carbon atoms, $R^4$ is —(CH$_2$)$_n$—, —(C$_2$H$_4$O)$_n$— or and n is 1 to 9;

(14)

where $R^1$ is H or an alkyl group having 1 to 5 carbon atoms, $R^4$ is —(CH$_2$)$_n$—, —(C$_2$H$_4$O)$_n$— or and n is 1 to 9;

(15)

where $R^1$ is H or an alkyl group having 1 to 5 carbon atoms, $R^4$ is —(CH$_2$)$_n$—, —(C$_2$H$_4$O)$_n$— or and n is 1 to 9; and (16)

where $R^1$ is H or an alkyl group having 1 to 5 carbon atoms, and n is 1 to 9.

7. The polymer electrolyte composite according to claim 1, wherein the weight ratio of said first monomer to said second monomer is from 100:3 to 3:100.

8. The polymer electrolyte composite according to claim 1, wherein the sum weight of said solute and said copolymer of acrylic derivative contains said copolymer in an amount of 5 to 50 wt %.

9. An electrolytic capacitor comprising an anode foil, a cathode foil and a separator sandwiched by said anode and said cathode foils, wherein said separator contains a polymer electrolyte composite for driving said electrolytic capacitor, wherein said polymer electrolyte composite comprises an electrolyte and an acrylic polymer containing a copolymer of acrylic derivative, wherein said electrolyte comprises a polar solvent and a solute comprising at least one of inorganic acids, organic acids and salts of both of said acids, and wherein said copolymer of acrylic derivative is a polymer of: a first monomer of at least one of a group of monofunctional monomers of acrylic derivatives monomer of each having at least one hydroxyl group at a terminal thereof and a polymerizable unsaturated double bond; and a second at least one of a group of multifunctional monomers of acrylic derivatives each having plural polymerizable unsaturated double bonds.

10. The electrolytic capacitor according to claim 9, wherein said separator has a weighting of 0.01 to 55 g/m$^2$.

11. The electrolytic capacitor according to claim 9, wherein said separator is of a porous resin film or a non-woven fabric.

12. The electrolytic capacitor according to claim 9, wherein said separator has a porosity of 10 to 90%.

* * * * *